H. McClinton,
Evaporating Pan,
Nº 36,471. Patented Sept. 16, 1862.
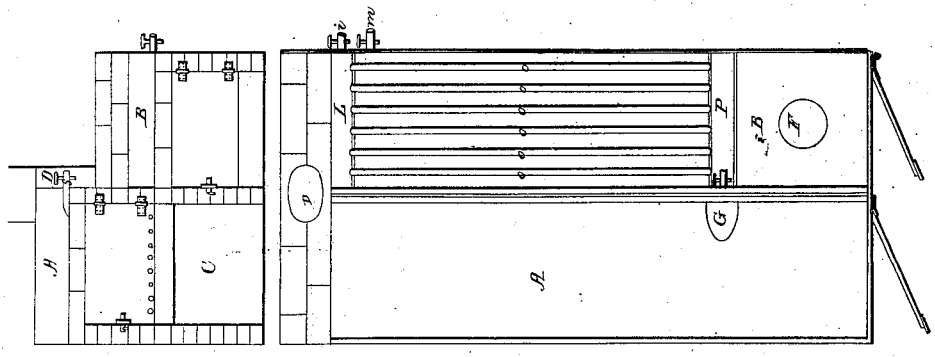
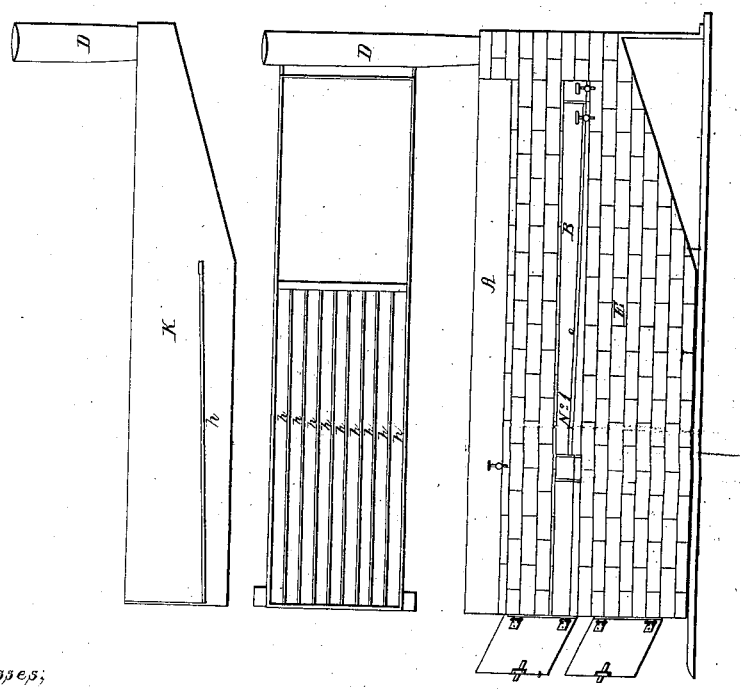
Witnesses:
E. B. Fairbank
Albert P. Davis
Inventor:
Hugh McClinton

UNITED STATES PATENT OFFICE.

HUGH McCLINTON, OF MORROW COUNTY, OHIO.

IMPPROVED APPARATUS FOR EVAPORATING AND DEFECATING SORGHUM-JUICE.

Specification forming part of Letters Patent No. 36,471, dated September 16, 1862.

*To all whom it may concern:*

Be it known that I, HUGH McCLINTON, of the county of Morrow and State of Ohio, have invented new and Improved Apparatus for Evaporating and Defecating the Juice of Sorghum or Chinese Sugar-Cane; and I do hereby declare the following to be a full and accurate description thereof, reference being had to the accompanying drawing, and to the letters of reference marked thereon.

The said invention consists of a double evaporating-pan to be made of copper, zinc, or galvanized iron, to be from five to ten feet in length, and from two to three feet in width, and each to be placed over a double furnace made of brick and mortar for permanent use, or a portable furnace made of sheet iron or metal.

The pan marked A in the accompanying drawing is elevated on the furnace, so that the lower edge or bottom thereof is even with the upper edge of the pan B, when both are placed in their proper positions in the furnace. The lower pan, B, is divided by partitions extending across the same into four compartments of unequal size. A faucet, S, is inserted into the pan A at the lower edge of the side thereof, next to the pan B, and immediately over the receiver P, for the purpose of conveying the juice or sirup from the pan A to the receiver P in the pan B. A number of tubes or pipes (marked o o o o o o) extends from the receiver P to the compartment L, each of said pipes or tubes opening at the ends thereof into receiver P and compartment L, said pipes or tubes, to be made of copper, zinc, or galvanized iron, having a diameter of from one to two inches, and to be from six to eight in number. The said pans are each placed horizontally on the furnace and nearly contiguous to each, the pan A being elevated above the pan B, as aforesaid. The raw juice of the sorghum is first let into the pan marked A in the accompanying drawing from a tub or other vessel through a faucet, and the pan being placed over a rapid fire in the furnace, the juice is first boiled in said pan to a proper consistency and until the extraneous matter or scum is brought to the surface and skimmed off. The raw juice is thus continuously let into the pan A from the tub or other vessel, and after boiling in said pan until it is reduced to a certain consistency it is continuously thereafter drawn off out of the pan A through the strainer G by the faucet S into the receiver P in the lower pan. The quantity of juice thus continuously let into and out of the pan A is regulated by the use of the said faucets, keeping a uniform quantity thereof in pan A, From the receiver P the juice or sirup passes into the pipes or tubes marked o o o o o o, and after being boiled therein until reduced to the desired consistency passes out of said pipes or tubes into the compartment L in the lower pan, from whence it is drawn off, through the faucet marked *i*, continuously into a vessel, the sirup in the receiver P, and while passing through the pipes or tubes o o o o o o and in the compartment L to be kept constantly boiling, and the rapidity with which it passes through said pipes or tubes to be governed by the quantity continuously let into the receiver P and out of the compartment L. Before the juice or sirup is let into the receiver P from pan A a quantity of raw juice is let into the lower pan, B, by means of a faucet from a vessel, and, passing through the strainer marked F onto the bottom of said lower pan, flows under the receiver P, (which is sufficiently elevated above the bottom of pan B to allow the juice to pass beneath it,) and rises and submerges the pipes or tubes marked o o o o o o, and is let out through the faucet marked *m* into a vessel. The raw juice is thus continuously let into the pan B, and while in said pan kept constantly boiling, and is continuously let out through the faucet *m* into a vessel, and from thence the juice thus boiled to a certain consistency in pan B is put into the pan A, and mixed with the raw juice therein, so as to allow it to pass with said raw juice through the strainer G into the receiver P, and through the pipes or tubes o o o o o o. The object of putting the raw juice in the pan B in the manner aforesaid is not to complete the evaporation thereof in said pan, but to boil the same to a certain consistency therein, and at the same time to submerge in the manner aforesaid, with the boiling juice in said lower pan, the pipes, or tubes marked o o o o o o, and thereby prevent the sirup while in the pipes or tubes from scorching or burning. The object in having the sirup to pass through and boil in said pipes or tubes in the manner above specified is to obtain rapid evaporation thereof after being reduced to a certain consistency without danger scorching the sirup, and without permitting any part of the sirup in said pipes or tubes become mixed with the more raw juice which covers or submerges said pipes.

I claim as my invention and for which I desire to secure Letters Patent of the United States—

The aforesaid apparatus for evaporating and defecating the juice of sorghum, consisting of said pans, strainers, faucets, pipes or tubes, and compartments, as described, in the manner aforesaid.

HUGH McCLINTON.

Attest:
H. P. DAVIS,
R. C. SMITH.